United States Patent
Seary

[11] 3,887,312
[45] June 3, 1975

[54] INJECTION MOLDING APPARATUS

[76] Inventor: Eugene G. Seary, 33 Alide Ave., Hillcrest Binghamton, N.Y. 13901

[22] Filed: Nov. 21, 1972

[21] Appl. No.: 308,477

Related U.S. Application Data

[63] Continuation of Ser. No. 157,605, June 28, 1971, abandoned, which is a continuation of Ser. No. 822,655, May 7, 1969, abandoned.

[52] U.S. Cl. ............... 425/3; 425/450 R; 425/245; 425/247; 425/145
[51] Int. Cl. ............... B29f 1/03; B29f 1/06
[58] Field of Search .......... 425/250, 450, 159, 158, 425/139, 3, DIG. 33, 245; 249/68, 69; 317/157.5

[56] References Cited
UNITED STATES PATENTS

| | | | |
|---|---|---|---|
| 2,480,313 | 8/1949 | Alden | 425/158 |
| 2,558,027 | 6/1951 | Wilson | 249/68 X |
| 2,587,070 | 2/1952 | Spillman | 249/66 X |
| 2,648,033 | 8/1953 | Hudson | 317/157.5 X |
| 2,666,230 | 1/1954 | Sherman | 425/139 |
| 2,996,863 | 8/1961 | Odell | 317/157.5 X |
| 3,164,753 | 1/1965 | Schroeder | 317/157.5 X |
| 3,341,897 | 9/1967 | Susuki et al. | 425/450 |
| 3,357,058 | 12/1967 | Kutik | 425/250 |
| 3,436,793 | 4/1969 | Trueblood | 425/159 |

FOREIGN PATENTS OR APPLICATIONS
1,332,027  6/1963  France .............. 425/450

*Primary Examiner*—J. Howard Flint, Jr.
*Attorney, Agent, or Firm*—Hubbell, Cohen & Stiefel

[57] ABSTRACT

Injection molding apparatus of the type having a movable platen and a fixed platen, with magnetic coils embedded in one of the platens and operable to produce sufficient magnetic attraction to draw the two platens together and hence close the molds carried thereby. Spring means are included for biasing the platens to an open position and means are provided for reversing the magnetizing force in the coils at the completion of the molding cycle in order to assist in the opening of the platens. Means are also included to operate in timed relation with the platens for closing the nozzle from the injection apparatus into the mold.

10 Claims, 6 Drawing Figures

INVENTOR
EUGENE G. SEARY

BY Hubbell &
ATTORNEYS.

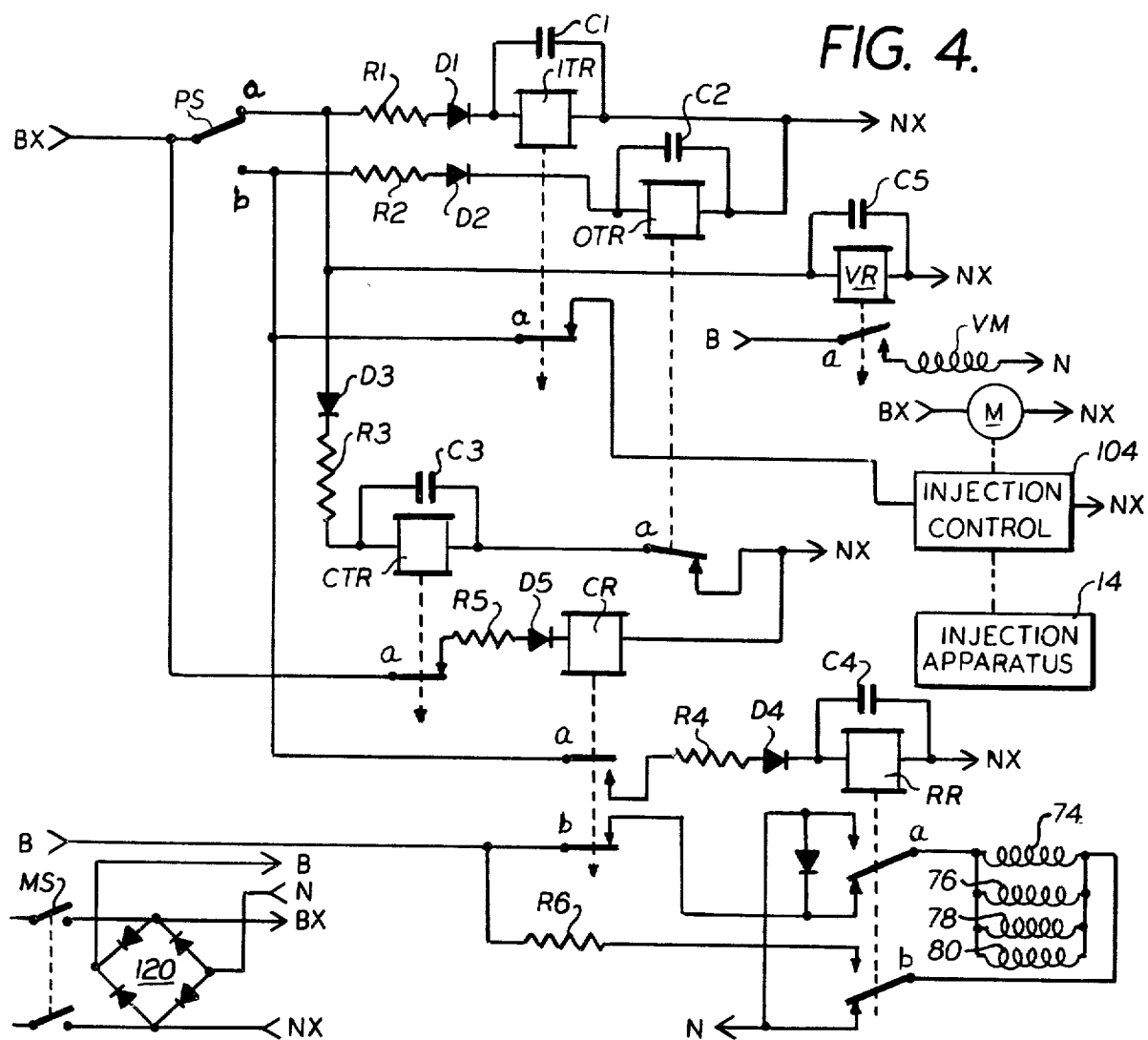
FIG. 4.
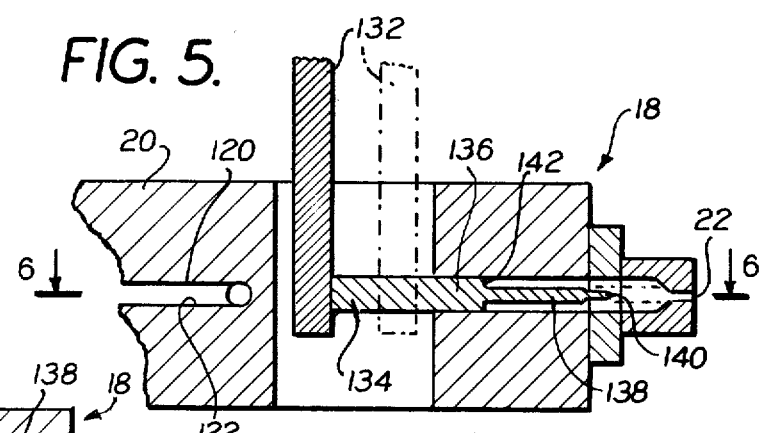
FIG. 5.
FIG. 6.
INVENTOR
EUGENE G. SEARY
BY
ATTORNEYS.

INJECTION MOLDING APPARATUS

This is a continuation of application Ser. No. 157,605, filed June 28, 1971, which is in turn a continuation of Ser. No. 822,655, filed May 7, 1969, both now abandoned.

FIELD OF THE INVENTION

This invention relates to injection molding apparatus and particularly to injection molding apparatus for molding thin articles such as plastic slide mounts.

THE PRIOR ART

The relatively removable platens of an injection molding apparatus are commonly moved either by hydraulic or electrical means connected to the platens through mechanical linkages.

SUMMARY OF THE INVENTION

The injection molding apparatus of the present invention has a fixed platen in which are embedded a plurality of annular magnetic coils ehich, when energized, establish a magnetic field for attracting a spaced-apart movable platen. The bringing together of the platens closes a mold, the halves of which are mounted on the two platens. Upon the platens closing, injection apparatus is actuated to inject a time measured amount of plastic material into the mold cavity and then discontinue operation. Upon discontinuing injection, a valve is closed to close the passage between the injection apparatus and the mold. Thereafter, means are actuated to send a reverse current through the magnetic coils whereby to pass the maagnetization curve through zero to eliminate residual magnetism in the system and thereby permit spring means to open the platens.

BRIEF DESCRIPTION OF THE DRAWINGS

FIG. 4 is a schematic circuit diagram illustrating the control system for the injection molding apparatus of the present invention;

FIG. 5 is a vertical longitudinal sectional view of the nozzle portion of the mechanism; and FIG. 6 is a sectional view taken along the line 6—6 in FIG. 5.

DETAILED DESCRIPTION OF THE PREFERRED EMBODIMENTS

Figure 1:
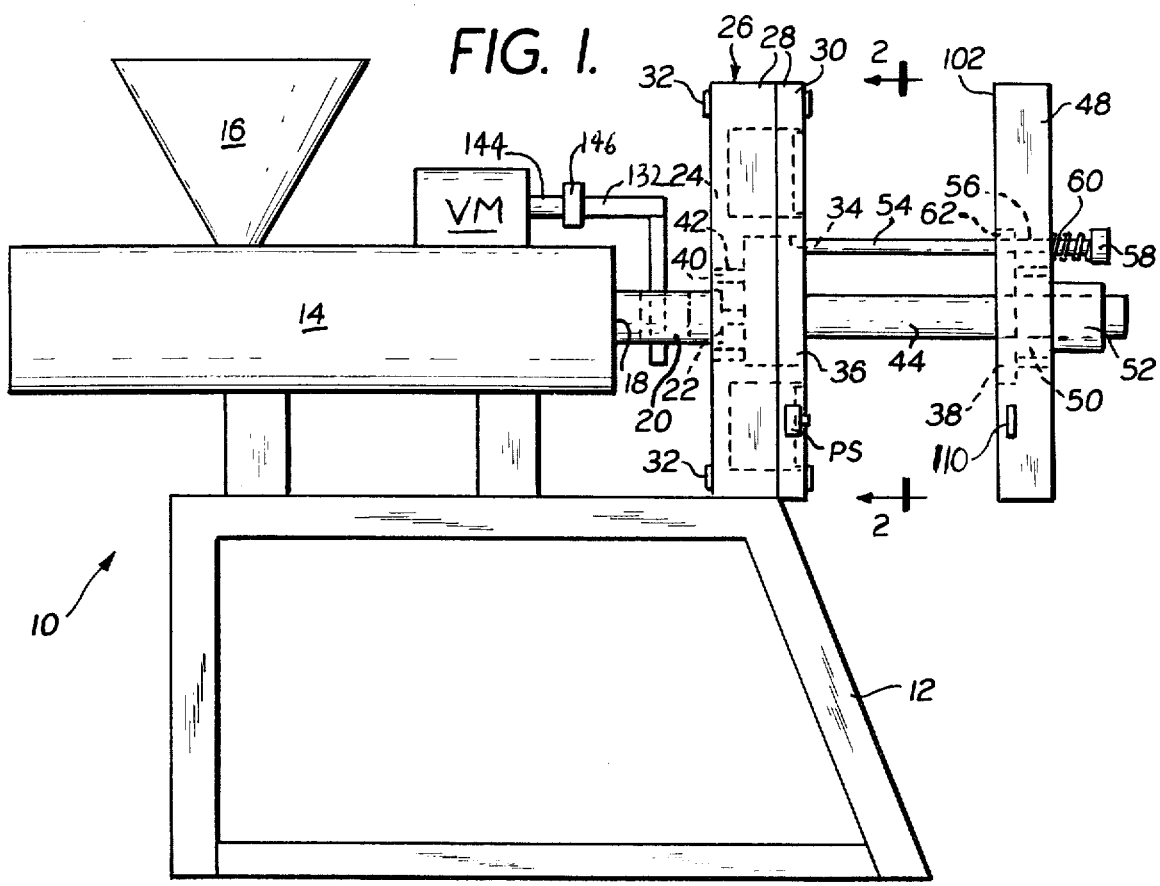
FIG. 1 is a side elevational view of an injection molding apparatus embodying the present invention.

Referring now to the drawings in detail, the injection molding apparatus 10 of the present invention includes a base 12 as of any suitable design on which is mounted any suitable form of injection apparatus 14 fed by a suitable material feed such as a molding compound hopper 16. The particular nature of the elements 14 and 16 forms no part of the present invention per se and any form of injection apparatus and feed therefore may be employed. At the exit end 18 of the injection molding apparatus is a cylindrical member 20 which terminates in a nozzle 22. The nozzle 22 is fitted into a complementary recess 24 in a platen 26 that is fixed to the base 12 of the apparatus 10. For convenience of construction, the platen 26 s shown herein is made of two plates 28 and 30 which are bolted together as by bolts 32. However, a unitary platen construction could be employed. The platen 26 is provided with a central recess 34 adapted to receive a mold half 36 therein. Preferably, although not necessarily, the article to be molded by the mold half 36 and its complementary mold half 38 is of relatively thin, plate-like or shallow nature. An example of such a shallow device is a plastic slide mount. The mold half 36 is secured within the recess 34 by bolts 40 passing through passages 42 in the platen 26. The mold half 36 is of the type wherein the material is fed through a passage extending from the rear of the mold into the mold cavity in its front face, although this is not necessary to the present invention.

Secured to the platen 26 are a pair of horizontal supports or rods 44 and 46, on which is slidably mounted the movable platen 48. The slidable mounting is effected by apertures 50 which are complementary to rods 44 and 46 which extend through plates 48 in register with the rods. To reduce friction, bushings 52 are secured to the platen 48 in register with apertures 50. To prevent accidental detachment of the movable platen 48 from the rods 44 and 46, a stop rod 54 is provided, which stop rod, as shown in FIG. 1, is secured to the fixed platen 26 and extends through a passage 56 in platen 48 and has a stop in the form of a nut 58 fixed at its free end. To avoid any undue shock to the movable platen 48 as well as to the apparatus 10, compression spring 60 may be disposed about the stop rod 54 in order to absorb the energy of impact should there be an accidental movement of platen 48 to the extreme right hand end of the apparatus, as viewed in FIG. 1.

Platen 48 is provided with a recess or mounting for complementary mold half 38, the recess being designated by the reference character 62.

While in FIG. 1 the movable platen 48 is shown removed a substantial distance from the fixed platen 26, in actuality, when molding thin items, the spacing will be rather slight, of the order of half an inch. However, the device can be employed for molding thicker parts, and if this is the case, then mechanical means (not shown) must be added to move the movable platen 48 back and forth a much greater extent than the half inch above mentioned.

In accordance with the present invention, the fixed platen 26 is provided with magnetic means for attracting the movable platen 48 thereto, whereby to clamp the two platens together to close the mold cavity defined by the two complementary mold halves. While various forms of magnetic means may be employed, it is presently preferred to embed in the fixed platen a multiplicity of relatively large annular coils which are actually disposed within recesses milled or burned therewithin for receiving the coils. Alternatively, the fixed platen 26 could be cast with annular recesses for receiving of the magnetic coils. As a further modification, the recesses could be cylindrical (or square, hexagonal, etc.) and permeable cores could be disposed within annular coils in the recesses rather than having the cores integral with the platen.

As shown herein, there are four annular recesses, 66, 68, 70, and 72 in which coils or windings 74, 76, 78 and 80, respectively, are disposed so that their axes run perpendicular to the face of the platen 26. Naturally, it is desirable that the platen be made of relatively high magnetically permeable material, but any suitable steel will suffice in an application of this type. Of course, a material of low magnetic permeability such as cast iron will not yield particularly satisfactory results.

As will be understood more fully hereinafter, the movable platen 48 never moves far from the fixed platen 26. Thus, upon energizing in synchronism the four windings 74, 76, 78, and 80, the magnetic attractive force generated by the four windings will be sufficient to attract the movable platen 48 into engagement with the fixed platen to thereby close the mold. Subsequently, by means which will be described hereinafter, energization of coils 74, 76, 78 and 80 will be discontinued to permit the movable platen 48 to be moved away from the fixed platen.

Figure 2:
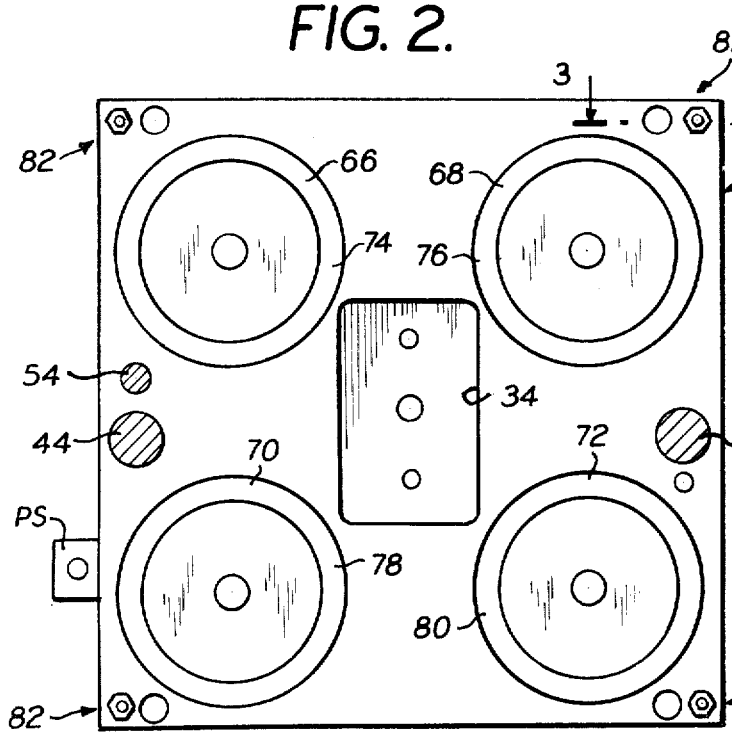
FIG. 2 is a sectional view taken along the line 2—2 of FIG. 1.
Figure 3:
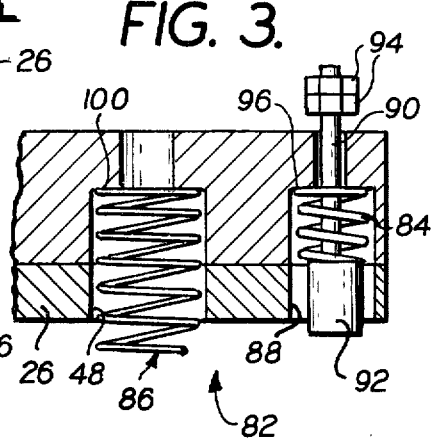
FIG. 3 is a fragmentary sectional view taken along the line 3—3 of FIG. 2.

In order to effect an automatic simple means for moving the movable platen 48 away from the platen 26 upon discontinuation of magnetic attraction, suitable spring means are provided. In accordance with a feature of the present invention, two forms of spring means are employed to accomplish this end. Referring now to FIG. 3, an example of the spring means is illustrated. The spring means is designated by the reference numeral 82, and there are actually four such spring means employed, one such means at each of the four corners of the fixed platen 26 (FIG. 2). The spring means 82, as already noted, includes two springs, one being a spring of great stiffness and short throw and designated by the reference character 84, and another of substantially less stiffness but much greater travel or throw designated by the reference character 86. The spring 84 is disposed within a recess or pocket 88 in the front of the platen 26 about a rod 90 that extends through the recess. At one end the rod is provided with a ram-like front 92 and behind the platen the rod has a suitable stop in the form of nut or nuts 94 threadedly disposed thereon. The recess 88 is stepped to provide a shoulder 96 for supporting one end of the spring 84, the other end of the spring being pressed against the inboard end of the ram or hammer end 92. This will bias the member 92 outwardly toward the movable platen 48. The softer spring 86 is shown seated in a relatively deep recess 98, which is provided with an abutment or bearing surface 100 therewithin to support the spring 86, the other end protruding subsantially beyond the face of platen 26, when spring 86 is not compressed.

When the magnets are energized to draw the movable platen 48 toward the fixed platen 26, the confronting surface 102 of movable platen 48 will first engage the soft springs 86. The magnetic force is sufficiently great to cause the platen 48 to be moving at a substantial rate as it approaches fixed platen 26, but the springs 86 working together will commence deceleration of the platen 48. However, to prevent an unwarrantedly large inpact upon the movable platen 48 impacting against the fixed platen 26, the stiff springs 84 and their hammer-like front ends 92 are provided for a final cushioning effect.

Upon the deenergization of the magnets, there will still be residual magnetism in the system but the stiff springs 84 tend to force the movable platen a short distance away from the fixed platen 26 against the residual magnetic attractive force to reduce substantially the magnetic attractive force whereupon the softer springs with effect of that force, namely, the springs 86, can take over greater travel, namely, the springs 86, can take over and push the movable platen the desired distance away from the fixed platen for ejection of a finished molded part. As will be more fully described subsequently, electrical means are also provided to reduce the residual magnetic effect.

While numerous means can be devised for controlling magnetic whidings and the injection molding apparatus in timed relations therewith, the presently preferred control apparatus is illustrated diagrammatically in FIG. 4. Referring now to FIG. 4, it will be seen that there are two power supplies, one a.c. and the other d.c. The a.c. power supply is controlled by a main switch MS and has terminal BX and NX. The d.c. power supply includes a full wave rectifier 120 powered from the a.c. supply, and having output terminals B and N. It will be seen that the control apparatus includes a platen switch, PS, which is mounted on the fixed platen 26 (FIGS. 1 and 2). Switch PS has a contact a which is normally closed when the platens are in their spaced apart or open position and is open when the platens are together to close the mold. There is a reverse contact b that is open when the platens are open and closed when the platens are together. Switch PS is operated by actuator 110 which is fixed to movable platen 48 and travels into and out of engagement with switch PS as the mold closes and opens, respectively. In addition, the control apparatus, as best seen in FIG. 4, includes an injection timer relay ITR which is of the slow release type which slow release characteristic is here shown to be caused by the inclusion of a snubbing capacitor C1 across the winding of relay ITR. The control apparatus further includes open timer relay OTR which is also a slow release type caused, for example, by inclusion of a snubbing capacitor C2; closed timer relay CTR which is of the slow release type, as by the provision of a snubbing capacitor C3; a contactor relay CR; and a reversing relay RR. In addition, the injection apparatus 14 is controlled by a suitable injection control apparatus 104 which may be a hydraulic valve controlling the output of apparatus 14, or, as shown, an electric clutch suitable for connecting the power source or motor M to the injection apparatus 14 to drive the injection apparatus when clutch 104 is energized.

Injection timer relay ITR is controlled by the contact a of platen switch PS, and its energizing circuit includes overcurrent protection resistor RI and a rectifier D1. The energizing circuit for relay ITR may be traced from terminal BX, over contact a of switch PS, through resistor R1, diode D1 and the winding of relay ITR to terminal NX. The energizing circuit for the open timer relay OTR may be traced from terminal BX, over contact b of platen switch PS, through current limiting resistor R2, rectifier diode D2, and the winding of relay OTR to terminal NX. The energizing circuit for relay CTR may be traced from terminal BX, over contact a of switch PS, through rectifier diode D3, current limiting resistor R3, the winding of relay CTR, and back contact a of relay OTR to the terminal NX. Contactor relay CR is energized by a circuit which may be traced from terminal BX, over front contact a of closed timer relay CTR, through current limiting resistor R5, rectifier diode D5, and the winding of control relay CR to terminal NX. Likewise, the energizing circuit for relay RR may be traced from terminal BX, over contact b switch PS, back contact a of relay CR, current limiting resistor R4, rectifier diode D4, and through the winding of relay RR, to the terminal NX. The magnetic windings 74, 76, 78 and 80 are provided with two energizing circuits, a forward energizing circuit for attracting spaced-apart movable platen 48 toward the fixed platen 26, and a reverse energizing circuit for reversing the magnetizing curve to approach or pass through a zero magnetizing force, whereby to enable the spring means 82 to more easily move the movable platen 48 away from the fixed platen 26. The forward energizing circuit for the magnetic windings may be traced from the terminal B of the DC source, over front contact *b* of contactor relay CR, over back contact *a* of reversing relay RR, through the magnetizing coils 74-80 inclusive in parallel, and over back contact *b* of relay RR to the negative terminal N of the DC source. The reverse energizing circuit for the magnetic coil may be traced from the positive terminal B, through current limiting resistor R6, the function of which will be described hereinafter, over front contact *b* of relay RR, through the windings 74 through 80 inclusive in parallel, and over the front contact *a* of reversing relay RR to terminal N.

In this connection it should be pointed out that the current limiting resistor R6 is interposed in the reverse energizing circuit for the magnetic coils 74-80 for the purpose of sharply reducing the reverse energizing current ad hence the maximum amount of magnetic attraction to the platens upon reverse operation. The only reason for reversing the magnetic field is to cause the magnetizing curve of the platens to pass through a zero magnetizing force point to thus substantially eliminate residual magnetism in the platens to enable the spring means 82 to more easily open the platens. If on reverse energization, magnetic attraction were built up to the same extent as it is on forward energization, the movable platen 48 would be almost immediately reattracted to the fixed platen 26, whereby to prevent the normal operation of the machine as will be now described.

Let it be assumed that the platens are in spaced apart relation, approximately ½ inch to ¾ inch apart, whereby platen switch PS is in its normal open position with contact *a* closed and contact *b* open. Let it further be assumed that in this position the main power switch MS is closed, whereby to put on both the a.c. and d.c. power. In such a condition, relay ITR will be energized over its previously traced energizing circuit, including terminal BX, contact *a* of switch PS, resistor R1, diode D1 and the winding of relay ITR to terminal NX. In addition, closed timer relay CTR will be energized by the circuit from terminal BX, over contact *a* of switch PS, diode D3, resistor R3, the winding of relay CTR, and back contact *a* of relay OTR to terminal NX. With relay CTR energized, contactor relay CR will also be energized over its energizing circuit which may be traced from the terminal BX, over front contact *a* of the CTR, resistor R5, diode D5, and the winding of relay CR to terminal NX. Relays OTR and RR are deenergized due to the fact that their energizing circuits include contact *b* of platen switch PS which is open. This is also true of injection apparatus controller or clutch 104.

With the apparatus in the described condition, the magnetic coils 74, 76, 78 and 80 are energized in the forward direction, whereby to attract the movable platen 48 towards the fixed platen 26 to thus close the mold. The coils' energizing circuit may be traced from terminal B of the DC source, over front contact *b* of controller relay CR, back contact *a* of reversing relay RR, through the parallel windings 74-80 inclusive in the forward direction, that is from left to right as viewed in FIG. 4, over back contact *b* of relay RR, to the negative terminal N of the DC source. The movable platen 48 will thus be under the influence of the magnetic field and will be attracted into engaging relation with the fixed platen 26. The closing of the platens, which causes the closing of the mold itself, will operate switch PS to reverse condition, whereby it opens contact *a* and closes contact *b* of switch PS. The opening of contact *a* of switch PS will denergize relays ITR and CTR, but this will have no immediate effect upon the apparatus as both of these relays are of the slow-release type. They will therefore remain in the position as if they were energized for a brief time interval. However, the closing of contact *b* of switch PS will immediately energize the injection control device 104 over the circuit which may be traced from terminal BX, over contact *b* of switch PS, over front contact *a* of relay ITR, and through the injection control apparatus 104 to terminal NX. This will cause immediate actuation of the injection apparatus 14, whereby to inject molding compound into the mold. Injection apparatus will continue this until relay ITR finally releases which will take approximately one second after the opening of contact *a* of switch PS. Upon the release of relay ITR, injection control apparatus 104 will be deenergized and will deactivate injection apparatus 14 to thus discontinue injection. Also, simultaneously with the closing of contact *b* of switch PS, the energizing circuit for relay OTR will be established from terminal BX, over contact *a* of switch PS, resistor R2, diode D2, and the winding of relay OTR to terminal NX, and relay OTR will also pick up, although this has no immediate effect upon the apparatus.

After slow release relay ITR finally releases as described, whereby to discontinue the injection of molding compound into the mold, slow release relay CTR will release, the release time for relay CTR being of the order of one second slower than that of relay ITR. When relay CTR does release, it will deenergize relay CR by opening the energizing circuit for the latter at front contact *a* of relay CTR.

With contactor relay CR deenergizied, it will release to close its back contact *a* and open its front contact *b*, whereby to discontinue the forward energizing circuit for magnetic coils 74 to 80. However, the closing of back contact *a* of relay CR will establish the energizing circuits for reversing relay RR which circuit may be traced from terminal BX, over contact *b* of relay PS, over back contact *a* of relay CR, and through the winding of relay RR to terminal NX. This will cause reversing relay RR to pick up, whereby to establish reverse energizing circuit for magnetic windings 74-80 which circuit may be traced from terminal B, through current limiting resistor R6, over front contact *b* of relay RR, through magnetic windings 74-80 in the reverse direction from right to left, and over front contact *a* of relay RR, to the negative terminal N of the source. This will cause a reversal of magnetization in the winding 74-80 whereby to cause the magnetization curve to pass through zero, to thereby facilitate the spring means 82 forcing the movable platen away from the fixed platen to thus open the mold and permit the ejection of the molded part. Upon the opening of the mold by the separation of the movable platen 48 from the fixed platen 26, the switch PS will operate to open contact *b* and close contact *a* whereby to cut off the reverse energizing circuits for magnetic coils 74–80, reenergize relay ITR, and deenergize relay OTR. Relay OTR will not immediately release due to its slow releasing characteristics. After a brief time interval, relay OTR will release to close its back contact a, whereby to reestablish the energizing circuits for relay CTR, to cause that relay to pick up, to thereby reestablish the energizing circuit for contact or relay CR, to cause that relay to pick up to reestablish the forward energizing circuit for the magnetic windings. Thus, the cycle has been completed, and the apparatus is ready for another operation.

In accordance with another feature of the present invention valve means are provided in the passage between the injection apparatus and the mold half 36 to close off that passage after completion of the desired period of injection, in order to insure that there will be no drooling of unwanted plastic material during the open time of the mold and that there will be no flow of material out of the mold as pressure in the injection apparatus 14 drops. As may best be seen in FIGS. 5 and 6, there is a passage 120 in the cylindrical member 20 which extends between the injection apparatus 14 and the nozzle 22 which passage has a first portion 122 on the injection apparatus side of member 20, a second branched portion made up of left and right branches 124 and 126, and a third portion 128 on the nozzle side of the member 20. The branched portions 124 and 126 extend around a diametrically extending aperture 130 in member 20 through which extends an actuating or a push rod 132 as will be described in greater detail hereinafter. The lower end of member 132 cooperates with an axially movable valve stem 134 having a relatively thickened left-hand portion 136, a narrowed down right-hand portion 138 and a needle like end 140 which is adapted to fit into nozzle 22 to close the nozzle. It will be seen that between portions 136 and 138 of valve stem 134 there is an annular shoulder 142.

Push rod 132 is L-shaped, as best seen in FIG. 1 and the horizontal portion thereof is connected to a rod or plunger 144 of a moving means such as a magnet VM, as by a coupling 146. Magnet VM is such that when energized it will move push rod 132 to the right. In accordance with the present invention, means are provided for energizing magnet VM a brief time interval after the injection control 104 is deenergized by the dropping of relay ITR, whereby to close the nozzle 22 and prevent drooling of plastic material from the injection apparatus into the mold cavity, which drooling would occur due to the pressure within the passage 120. As may best be seen in FIG. 4, a relay VR is provided for effecting the control of the magnet VM, which relay is snubbed by a capacitor C5 to make it slow releasing, the release time being slightly greater than the release time for relay ITR, but somewhat quicker than the release time of relay CTR. It can be seen from FIG. 4 that relay VR is energized by a circuit which may be traced from terminal BX, over contact a of switch PS, and through the winding of relay VR to terminal NX. As stated, with relay VR energized, magnet VM will be deenergized as its energizing circuit is controlled by the back contact a of relay VR which is open while relay VR is energized.

However, since there is no biasing means against valve stem 134, for reasons which will become apparent hereinafter, valve stem 134 will be in a right-hand or closing position with respect to the nozzle 22. When the injection control 104 is energized to thereby energize or actuate injection apparatus 14, plastic material will be forced through passage 120 to thereby build up significant pressure in passage portion 128, which pressure will operate on the shoulder 142 and force the valve stem 134 to the left, as there is no magnetic force to hold it in its right-hand position. This will open the nozzle 22 and permit plastic to pass therethrough into the mold cavity. However, upon the dropping of relay ITR to deenergize injection control 104 and thus deactuate injection apparatus 14, the pressure within passage portion 128 will diminish. Moreover, shortly after the release of relay ITR, relay VR will release, whereby to energize magnet VM and thus cause the push rod 132 to move to the right as viewed in FIGS. 1, 5 and 6 to force valve stem 134 to the right and thereby close nozzle 22. The closing of nozzle 22 will prevent any plastic material from drooling out of the nozzle under the residual pressure in the passage portion 128.

Upon the restoration of the remainder of the control apparatus to the initial condition, relay VR will become reenergized over contact a of platen switch PS whereby to deenergize magnet VM and recondition the valve stem for leftward movement under the force resulting from molding compound pressure in passage portion 128. In the event of a multi-cavity mold, one valve stem 134 may be employed to control the molding compound supply to all cavities, or a separate valve stem per cavity can be used.

What is claimed is:

1. In an injection molding apparatus including a pair of platens relatively movable between closed and open positions for closing and opening a mold, means for moving said platens into and out of said two relative positions comprising:
   a. an electro-magnetic winding embedded in one of said platens;
   b. circuit means for energizing said winding with a magnetizing current in one direction for attracting said other platen thereto to close said platens;
   c. means for biasing said platens to their open position; and
   d. circuit means for energizing said winding with a current in the reverse direction of a value sufficient to reduce residual magnetism to a degree that said baising means can move said platens to said open position but below a value to reclose said platens.

2. The injection apparatus of claim 1, wherein said biasing means are spring means.

3. The injection apparatus of claim 2, wherein said spring means includes a first relatively stiff spring and a second spring less stiff than said first spring, said second spring having a greater throw than said first spring.

4. The injection apparatus of claim 1, further comprising injection apparatus including passage means leading to the mold, means for enabling and disabling said injection apparatus, means for energizing said enabling-disabling means upon the closing of said platens to inject molding compound into said mold and means for deenergizing said enabling-disabling means a predetermined time interval after said platens close whereby to discontinue the injection of molding compound when the mold is substantially filled.

5. The injection apparatus of claim 4, further comprising valve means in said passage means, means for opening said valve means upon said injection apparatus being enabled, and means for closing said valve means a predetermined brief time interval after said injection apparatus is disabled for preventing injection of any substantial quantity of molding compound by residual pressure in said passage means after said injection means has been disabled.

6. The injection apparatus of claim 5, wherein said means for opening said valve means is pressure responsive.

7. In an injection molding apparatus including a pair of platens relatively movable between closed and open positions for closing and opening a mold, means for moving said platens into and out of said two relative positions, injection apparatus including passage means leading to the mold, means for enabling and disabling said injection apparatus, valve means in said passage means, means for opening said valve means when said injection apparatus is enabled, and means for closing said valve means a predetermined brief time interval after said injection apparatus is disabled for preventing injection of any substantial quantity of molding compound by residual pressure in said passage means after said injection means has been disabled.

8. In an injection molding apparatus including a pair of platens relatively movable between closed and open positions for closing and opening a mold;
  I. means for moving said platens into and out of said two relative positions comprising:
    a. an electro-magnetic winding embedded in one of said platens for magnetically attracting the other of said platens to close the mold when said winding is energized;
    b. a switch having a first condition when said platens are open and a second condition when said platens are closed;
    c. a first switching means having energized and deenergized positions and being operable therebetween, said first switching means further including means for delaying the operation of said first switching means from its energized to its deenergized positions, circuit means for energizing said first switching means closed when said switch is in said first condition;
    d. a second switching means having energized and deenergized positions and being operable therebetween, said second switching means further including means for delaying the operation of said second switching means from its energized to its deenergized position, circuit means for energizing said second switching means closed when said switch is in said second condition;
    e. a third switching means having energized and deenergized positions and being operable therebetween, said third switching means further including means for delaying the operation of said third switching means from its energized to its deenergized positions, and having a longer delay than said first switching means, circuit means for energizing said third switching means and closed only when said switch is in said first condition and said second switching means is in its deenergized position;
    f. circuit means for energizing said electromagnetic winding in one direction closed when said third switching means is energized;
    g. a reversing relay, circuit means for energizing said reversing relay closed only when said switch is in said second condition and said third switching means is in its deenergized position;
    h. circuit means for energizing said electromagnetic winding in the reverse direction when said reversing relay is energized;
    i. means for biasing said platens to their open position; and
  II. injection apparatus, means for rendering effective said injection apparatus when said switch is in said second condition and said first switching means is in its energized position.

9. The injection apparatus of claim 8, wherein said circuit means for energizing said electromagnetic winding in the reverse direction includes current limiting means.

10. The injection apparatus of claim 8, said injection molding apparatus having passage means communicating between said injection apparatus and said platens, said injection molding apparatus further comprising:
  a. valve means in said passage means;
  b. pressure responsive means for opening said valve when the pressure in said passage is greater than a predetermined value;
  c. a fourth slow release switching means having energized and deenergized positions and being operable therebetween, said fourth switching means further including means for delaying the operation of said fourth switching means longer than said first switching means and shorter than said third switching means, circuit means for energizing said fourth switching means closed when said switch is in its first condition;
  d. means for closing said valve, and circuit means for energizing said valve closing means including a contact of said fourth switching means closed when said fourth switching means is in its deenergized position.

* * * * *